July 7, 1959     L. J. REITMAN     2,894,193
EMERGENCY AIRCRAFT ALTITUDE CONTROL SYSTEM
Filed Feb. 3, 1956
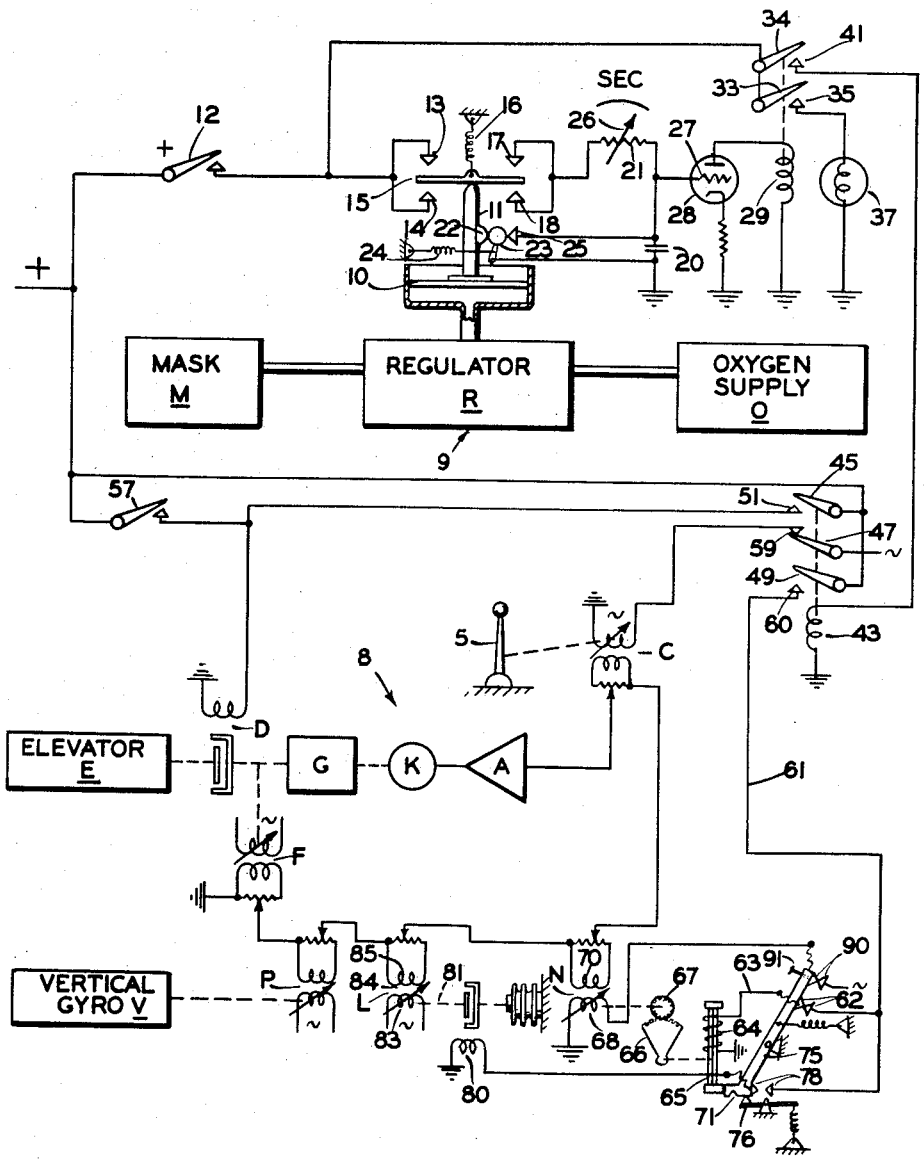
INVENTOR.
LESTER J. REITMAN
BY
Oscar B. Brumback
ATTORNEY

United States Patent Office 2,894,193
Patented July 7, 1959

2,894,193

EMERGENCY AIRCRAFT ALTITUDE CONTROL SYSTEM

Lester J. Reitman, New York, N.Y., assignor to Bendix Aviation Corporation, Teterboro, N.J., a corporation of Delaware Application February 3, 1956, Serial No. 563,256

6 Claims. (Cl. 318—450)

This invention relates generally to a control system for aircraft.

If the cabin of an aircraft which is flying at an altitude in excess of fifteen thousand feet is not pressurized, the pilot must use oxygen equipment. Should the oxygen equipment fail under these conditions, the pilot will die from anoxemia within a few minutes if aid does not reach him or he is not brought to an elevation where the pressure is such that it is possible for the pilot to regain consciousness.

An object of the present invention, therefore, is to provide a novel means for returning an aircraft to a safe altitude level when the pilot ceases to breathe at a predetermined rate.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

The single sheet of drawing illustrates schematically the novel safety device of the present invention in cooperation with conventional oxygen equipment and a conventional type automatic control system for aircraft.

Referring to the drawing, the novel safety apparatus of the present invention may be utilized with a conventional automatic control system 8 and conventional oxygen equipment 9.

Automatic control system 8 may include a motor K which is adapted to be connected to the elevator surface E of the craft by way of a suitable gear train G and a magnetic clutch D and which is operative in response to the output of a suitable amplifier A. The input to amplifier A is a signal chain formed by connecting in series inductive devices F, P, L, N, and C. Inductive device F is actuated by motor K to provide a follow-up signal, inductive device P is actuated by a conventional vertical gyro V to provide a pitch attitude signal, inductive devices L and N are actuated by the novel safety apparatus as will be described later, and inductive device C is actuated by a suitable manual controller, such as stick controller S, to provide for manual control of the craft. When clutch D is engaged to connect motor K with surface E, the foregoing automatic control system operates in a conventional manner to maintain the craft in a level attitude or in the attitude commanded by the movement of control stick S.

The oxygen equipment may comprise a conventional type mask M, regulator R and oxygen supply O. The pneumatically actuated blinker or breathing switch 10 of the regulator is moved up and down to an open and closed position in a well known manner by the rythmical breathing pulses of the pilot.

The present invention provides this blinker with a shaft 11 and utilizes the movement of the shaft by the blinker action to determine the breathing rate of the human pilot. When a master switch 12 is closed, direct current excitation from a suitable source, not shown, is supplied to contacts 13 and 14. Thereafter, the movement of plate 15 by shaft 11 against the bias of a compression spring 16 selectively bridges contacts 13 and 17 at one extreme position and contacts 14 and 18 at the other extreme position to charge a condenser 20 which is connected by way of a variable resistor 21 to contacts 17 and 18. At an intermediate position, a cam 22 on shaft 11 moves a follower 23 against the bias of a tension spring 24 to engage contact 25 to discharge capacitor 20.

The rate of charging of capacitor 20 is governed by the R-C time constant determined by the values of the variable resistor 21 and capacitor 20, the position of wiper 26 on resistor 21 controlling the resistance value. This time constant may be set by the displacement of wiper 26 so that under normal conditions, the voltage on grid 27 of a vacuum tube 28 will not be enough to cause a relay 29 to be operated. Since cam 23 and contact 25 connect opposite sides of capacitor 20, the engagement of the cam and contact discharges capacitor 20 substantially instantaneously.

Any abnormal condition which would cause a slowing down of the blinker operation such as may result from undue slowness of breathing of the pilot (an initial phase anoxemia), loss of oxygen, or any other condition which would interfere with normal inhalation and exhalation of the pilot would cause plate 15 to bridge contacts 13, 17 or contacts 14, 18 for a greater than normal period of time. Accordingly, the charge will build up on grid 27 of tube 28 to cause the tube to develop an output sufficient to actuate relay 29 and pull armatures 33 and 34 downwardly from the position shown.

The engagement of armature 33 and contact 35 energizes a suitable alarm such as light 37 to show that the pilot has ceased to breathe at a regular rate. The engagement of armature 34 and contact 41 energizes a relay 43, pulling its armatures 45, 47 and 49 downwardly from the position shown.

The engagement of armature 45 and contact 51 energizes magnetic clutch D to engage the automatic control system 8 with the elevator control surface E, if switch 57 has not already been moved to a closed position to engage the control system. The disengagement of armature 47 and contact 59 deenergizes inductive device C so that no manual control signal will be placed into the signal chain to amplifier A.

The engagement of armature 49 and contact 60 supplies energy by way of a lead 61, contacts 62 and a lead 63 to the heater 64 on a bimetallic element 65 which is suitably insulated so as to not be appreciably influenced by ambient temperatures. As it heats, the flexing of element 65 by way of a sector 66 and gear 67 displaces the rotor 68 of an inductive device N relative to stator 70 to provide a signal to operate motor K in a direction to displace elevator E to cause the aircraft to descend.

The flexing of bimetallic element 65 also moves a pin 71 which actuates a lever 75. After a predetermined time, the movement of lever 75 is such as to disengage contact 62 to interrupt the heating of the bimetallic element, and a detent 76 engaging in a slot in pin 71 maintains lever 75 in its last position, even though the bimetallic element cools. The movement of member 75 also engages contacts 78 which energize the magnetic clutch 80 of an altitude control 81 that may be similar to that described in U.S. Patent No. 2,512,902, issued June 27, 1950, to Henry F. S. Rossire.

After the engagement of clutch 81, any deviation of the craft from the engaged altitude causes a displacement of rotor 83 of inductive device 84 relative to stator 85 to develop a signal to cause the craft to return to the engaged altitude level. The disengagement of contacts 90 as contacts 78 are engaged deenergizes rotor 68 so as to eliminate the signal of inductive device N from the signal chain of the automatic control system, one contact 90 being connected to lever 75 to provide for lost motion as by rod and stop 91 so that contacts 90 are disengaged at the instant contacts 78 are engaged.

The foregoing has presented a novel device connecting the oxygen equipment for a pilot with an automatic control system so that, when the pilot ceases to breathe at a normal rate, an RC network which has been periodically grounded but is no longer grounded energizes a solenoid for operating a warning light and placing into control an altitude descent device; the altitude descent device, when actuated, causing the craft to descend for a predetermined interval of time to bring the craft to an altitude level at which the pilot can regain consciousness and maintain the craft at this lower level.

Although but one embodiment of the invention has been illustrated and described, various changes can be made in the design and arrangement of the parts without departing from the spirit and scope of the invention as the same will now be understood by those skilled in the art.

I claim:

1. A safety device for use in an aircraft adapted to fly at high altitudes, comprising a system for automatically controlling the pitch attitude of the craft, a system for supplying oxygen to the human pilot, and means connected with said oxygen system and responsive to the breathing of the pilot for actuating said automatic control system for a predetermined time to cause said craft to return to a lower level when the pilot ceases to breathe at a predetermined rate.

2. A safety device for use in an aircraft adapted to fly at high altitudes, comprising a system for automatically controlling the pitch attitude of the craft, a system for supplying oxygen to the human pilot, and means connected with said oxygen system and responsive to the rate of breathing of the pilot for actuating said automatic control system to cause said craft for a predetermined time to return to a lower level when the pilot ceases to breathe at a predetermined rate.

3. A safety device for use in an aircraft adapted to fly at high altitudes, comprising a system for automatically controlling the pitch attitude of the craft, a system for supplying oxygen to the human pilot, said oxygen system including a breathing switch movable in response to the breathing of the pilot, and means responsive to the rate of movement of said breathing switch for actuating said automatic control system for a predetermined time to bring said craft to a lower altitude level when said rate changes a predetermined amount.

4. A safety device for use in an aircraft adapted to fly at an altitude at which the human pilot must use oxygen equipment, comprising an automatic control system for controlling the pitch attitude of the craft, a system for supplying oxygen to the pilot, said oxygen system including a breathing switch movable in response to the breathing of said pilot, a capacitor, means tending to charge and discharge said capacitor upon movement of said breathing switch, means actuated for a predetermined time when said capacitor is abnormally charged to return said craft to a lower altitude level, and means for determining the length of time required to charge said capacitor, whereby said capacitor is not charged as long as the pilot breathes at a predetermined rate but is charged when the pilot ceases to breathe at this predetermined rate and the craft is brought to a lower altitude level.

5. A safety device for use in an aircraft adapted to fly at an altitude at which the human pilot must use oxygen equipment, comprising an automatic control system for controlling the pitch attitude of the craft, a system for supplying oxygen to the pilot, said oxygen system including a breathing switch movable in response to the breathing of said pilot, a capacitor, means tending to charge and discharge said capacitor upon movement of said breathing switch, means actuated when said capacitor is abnormally charged to cause said craft to descend for a predetermined length of time, means actuated after said predetermined length of time for maintaining said craft at the altitude level at that time, and means for determining the length of time required to charge said capacitor, whereby said capacitor is not charged as long as the pilot breathes at a predetermined rate but is charged when the pilot ceases to breathe at this predetermined rate.

6. A safety device for use in an aircraft adapted to fly at an altitude at which the human pilot must use oxygen equipment, comprising an automatic control system adapted to be engaged with said craft for controlling the pitch attitude of the craft, a system for supplying oxygen to the pilot, said oxygen system including a breathing switch movable in response to the breathing of said pilot, a capacitor, means tending to charge and discharge said capacitor upon movement of said breathing switch, means actuated when said capacitor is abnormally charged to engage said automatic control system with said craft and including means to place said craft in a dive attitude, means for discontinuing said dive attitude after a predetermined length of time, and means actuated by said last-named means for maintaining the craft at its altitude level at that time, and means for determining the length of time required to charge said condenser whereby said condenser is not charged as long as the pilot breathes at a normal rate.

References Cited in the file of this patent

UNITED STATES PATENTS

| | | |
|---|---|---|
| 2,596,152 | Johnson | May 13, 1952 |
| 2,597,892 | Nash | May 27, 1952 |